United States Patent
Iwao et al.

(10) Patent No.: US 8,781,700 B2
(45) Date of Patent: Jul. 15, 2014

(54) COASTING CONTROL DEVICE

(75) Inventors: Nobuyuki Iwao, Fujisawa (JP); Yasushi Yamamoto, Fujisawa (JP); Kazuhiko Kobayashi, Yokohama (JP); Hiroyuki Arai, Yokohama (JP); Kouhei Takama, Yokohama (JP)

(73) Assignees: Isuzu Motors Limited, Tokyo (JP); Transtron Inc., Yokohama-shi (JP)

( * ) Notice: Subject to any disclaimer, the term of this patent is extended or adjusted under 35 U.S.C. 154(b) by 0 days.

(21) Appl. No.: 13/807,787

(22) PCT Filed: Jul. 1, 2011

(86) PCT No.: PCT/JP2011/065182
§ 371 (c)(1),
(2), (4) Date: Dec. 31, 2012

(87) PCT Pub. No.: WO2012/002534
PCT Pub. Date: Jan. 5, 2012

(65) Prior Publication Data
US 2013/0103275 A1   Apr. 25, 2013

(30) Foreign Application Priority Data
Jul. 2, 2010   (JP) .................................. 2010-152125

(51) Int. Cl.
*G06F 7/00* (2006.01)
(52) U.S. Cl.
USPC ........................................................ 701/68
(58) Field of Classification Search
CPC ..... B60W 10/06; B60W 10/02; B60W 20/00; B60W 10/08
USPC ........................................................ 701/68
See application file for complete search history.

(56) References Cited

U.S. PATENT DOCUMENTS

2008/0215219 A1 *  9/2008  Porzel et al. .................... 701/68

FOREIGN PATENT DOCUMENTS

| JP | 8-67175 | 3/1996 |
|---|---|---|
| JP | 2006-342832 | 12/2006 |
| JP | 2007-205445 | 8/2007 |

OTHER PUBLICATIONS

International Report on Patentability mailed Feb. 12, 2013 for corresponding International Application No. PCT/JP2011/065182.
Written Opinion of the International Searching Authority mailed Sep. 27, 2011 for corresponding International Application No. PCT/JP2011/065182.
International Search Report of Corresponding PCT Application PCT/JP2011/065182 mailed Sep. 27, 2011.
Patent Abstracts of Japan, Publication No. 2006-342832, Published Dec. 21, 2006.
Patent Abstracts of Japan, Publication No. 2007-205445, Published Aug. 16, 2007.
Patent Abstracts of Japan, Publication No. 08-067175, Published Mar. 12, 1996.

* cited by examiner

*Primary Examiner* — James Trammell
*Assistant Examiner* — Michael D Lang
(74) *Attorney, Agent, or Firm* — Staas & Halsey LLP

(57) ABSTRACT

A coasting control device for reducing uneasiness experienced by a driver when pressing a clutch pedal during coasting control. The device includes a clutch control unit that, when the clutch pedal is pressed during coasting control, controls an actuator to cause an amount of hydraulic oil that depends on the amount of depression of the clutch pedal to be ejected from a clutch-free operating cylinder.

2 Claims, 9 Drawing Sheets

COASTING CONTROL DEVICE

CROSS REFERENCE TO RELATED APPLICTIONS

This application claims the benefit of Japanese Patent Application No. 2010-152125, filed on Jul. 2, 2010, the contents of which is incorporated herein by reference, which serves as priority for PCT Application No. PCT/JP2011/065182, filed Jul. 1, 2011

TECHNICAL FIELD

The present invention relates to a coasting control device configured to be installed in a vehicle equipped with a manual and automatic dual-mode clutch system, and more particularly, to a coasting control device capable of reducing uneasiness experienced by a driver when the driver presses the clutch pedal during coasting control.

BACKGROUND ART

When the accelerator pedal of a vehicle is pressed while the clutch is disengaged, the accelerator (throttle) is opened to cause the engine to run at "idle" and the engine RPM (the number of revolutions of the engine) is stabilized at the engine RPM corresponding to the accelerator opening degree (accelerator position). At that point in time, the driving force generated by the engine and the internal resistance (friction) of the engine are in equilibrium and the engine output torque is 0. That is, the engine does no work for the outside the engine and fuel is wasted.

The engine does no work for the outside not only during idling caused by disengagement of the clutch as described above but also while the vehicle is in motion. In this situation, the engine only revolves at an engine RPM corresponding to the accelerator opening degree as in idling and does not contribute to acceleration or deceleration of the vehicle. Accordingly, the fuel is consumed only in causing the engine to revolve uselessly, which is highly wasteful.

The present applicant has proposed a coasting control device that performs coasting control that disengages the clutch and places the engine in idle state to save fuel consumption while the engine is running but is doing no work for the outside the engine (Patent Literature 2).

Coasting control is a technique, employed in a vehicle equipped with a mechanism capable of automatically disengaging the clutch, to improve fuel economy by automatically disengaging the clutch to reduce the engine RPM to an idle RPM or an RPM equivalent to that while the engine is revolving but doing no work for the outside the engine.

Since coasting control can be used in any vehicle that is capable of automatically turning off the engine output (automatically disengaging the clutch) as described above, the same effect can be achieved not only in a manual clutch system (manual T/M) but also in an automatic clutch system (conventional torque converter AT or AMT).

PRIOR ART DOCUMENTS

Patent Document 1: Japanese Patent Application Publication No. 8-67175
Patent Document 2: Japanese Patent Application Publication No. 2006-342832

However, the technique described in Patent Literature 2 may disengage the clutch while a driver is pressing the accelerator pedal in an attempt to accelerate. Accordingly, the driver may feel torque reduction and uneasiness while switching from deceleration to acceleration.

To address this, the present applicant has prepared a coasting control judgment map which uses as measures the accelerator opening degree of opening and the clutch rotation speed and has proposed a coasting control device that starts coasting control when the coordinate points of the accelerator opening degree and the clutch rotation speed have passed a preset coasting control threshold line toward a direction in which the degree of opening of the accelerator decreases.

There is a manual and automatic dual-mode clutch system that can disengage a clutch with both a clutch pedal and an actuator.

As illustrated in FIG. 11, in a manual and automatic dual-mode clutch system 51, a clutch master cylinder 53 mechanically coupled with a clutch pedal 52 is designed to supply hydraulic oil to a clutch-free operating cylinder 54. On the other hand, a clutch-free actuator unit 55 controlled by an electronic control unit (ECU) is also designed to supply hydraulic oil to the clutch-free operating cylinder 54. The clutch-free operating cylinder 54 is designed to supply hydraulic oil to a clutch slave cylinder 56. A piston 56a of the clutch slave cylinder 56 is mechanically coupled with a movable part of a clutch 58.

As illustrated in FIG. 12, the clutch-free operating cylinder 54, and solenoid valves 62, a relief valve 63, and a hydraulic pump 64, which constitute the clutch-free actuator unit 55, are provided in a clutch-free actuator 65. The clutch-free operating cylinder 54 includes a primary piston 66 and a secondary piston 67 arranged in series. When hydraulic oil from the clutch master cylinder 53 causes the primary piston 66 to stroke, the secondary piston 67 strokes along with the primary piston 66. Hydraulic oil supplied from the clutch-free actuator unit 55 to an intermediate cylinder chamber 61a provided between the primary piston 66 and the secondary piston 67 causes the secondary piston 67 to stroke. The clutch slave cylinder 56 is supplied with hydraulic oil according to the stroke of the secondary piston 67. When a manual operation is performed in this configuration, the clutch is disengaged or engaged according to the manual operation. When the manual operation is not being performed, the clutch is disengaged or engaged according to control of the clutch-free actuator unit 55 by the electronic control unit.

In the dual-mode clutch system 51 as described above, the clutch-free actuator unit 55 supplies hydraulic oil to the intermediate cylinder chamber 61a to accomplish control to disengage the clutch 58 during coasting control.

In a coasting control device, on the other hand, coasting control is performed regardless of the intention of the driver when predetermined conditions are satisfied. Accordingly, usually the driver is not aware that coasting control is being performed. Therefore, the driver may press the clutch pedal 52 during the coasting control.

However, since hydraulic oil is being supplied to the intermediate cylinder chamber 61a by the clutch-free actuator unit 55 during coasting control, the clutch pedal 52 feels too heavy to press and the driver experiences uneasiness. Furthermore, when the driver presses the clutch pedal 52 with great force during coasting control, the clutch pedal 52 can kick back, which can make the driver so panicky that the driver is placed in a dangerous mode.

SUMMARY OF THE INVENTION

An object of the present invention is to solve the problem and to provide a coasting control device that is configured to be installed in a vehicle including a manual and automatic dual-mode clutch system and is capable of reducing uneasiness experienced by a driver when the driver presses a clutch pedal during coasting control.

The present invention has been made to achieve the object and provides a coasting control device configured to be installed in a vehicle including a clutch system that is supplied with hydraulic oil in response to depression of a clutch pedal or control by an actuator and disengages a clutch according to the amount of the supplied hydraulic oil and, when an engine is not doing any work for the outside the engine while the vehicle is moving, perform coasting control to cause the actuator to disengage the clutch and decrease an engine RPM to an idle RPM. The coasting control device includes a clutch control unit performing a control to cause an amount of the supplied hydraulic oil that depends on the amount of depression of the clutch pedal to be ejected from the actuator when the clutch pedal is pressed during coasting control.

The coasting control device may include a clutch pedal depression amount sensor measuring the amount of depression of the clutch pedal. The clutch system may include a clutch-free operating cylinder including a primary piston and a secondary piston arranged in series, and the actuator including a hydraulic pump supplying hydraulic oil to an intermediate cylinder chamber provided between the primary piston and the secondary piston and a solenoid valve controlling the amount of hydraulic oil ejected from the intermediate cylinder chamber. The clutch control unit may determine the amount of hydraulic oil to be ejected from the intermediate cylinder chamber according to the amount of depression of the clutch pedal measured by the clutch pedal depression amount sensor and may control the solenoid value of the actuator to cause the determined amount of hydraulic oil to be ejected from the intermediate cylinder chamber.

The clutch system may include a clutch-free operating cylinder including a primary piston and a secondary piston arranged in series and the actuator including a hydraulic pump supplying hydraulic oil to an intermediate cylinder chamber provided between the primary piston and the secondary piston and a solenoid valve controlling the amount of hydraulic oil ejected from the intermediate cylinder chamber. The clutch system may include an oil pressure sensor measuring the pressure of hydraulic oil in the intermediate cylinder chamber and the clutch control unit may control the solenoid valve of the actuator so that the pressure of hydraulic oil measured by the oil pressure sensor is maintained constant to cause an amount of hydraulic oil that depends on the amount of depression of the clutch pedal to be ejected from the intermediate cylinder chamber.

The present invention can provide a coasting control device capable of reducing uneasiness experienced by a driver when the driver presses a clutch pedal during coasting control.

DESCRIPTION OF THE EMBODIENTS

Preferred embodiment of the present invention will be described below with reference to the accompanying drawings.

Figure 1:
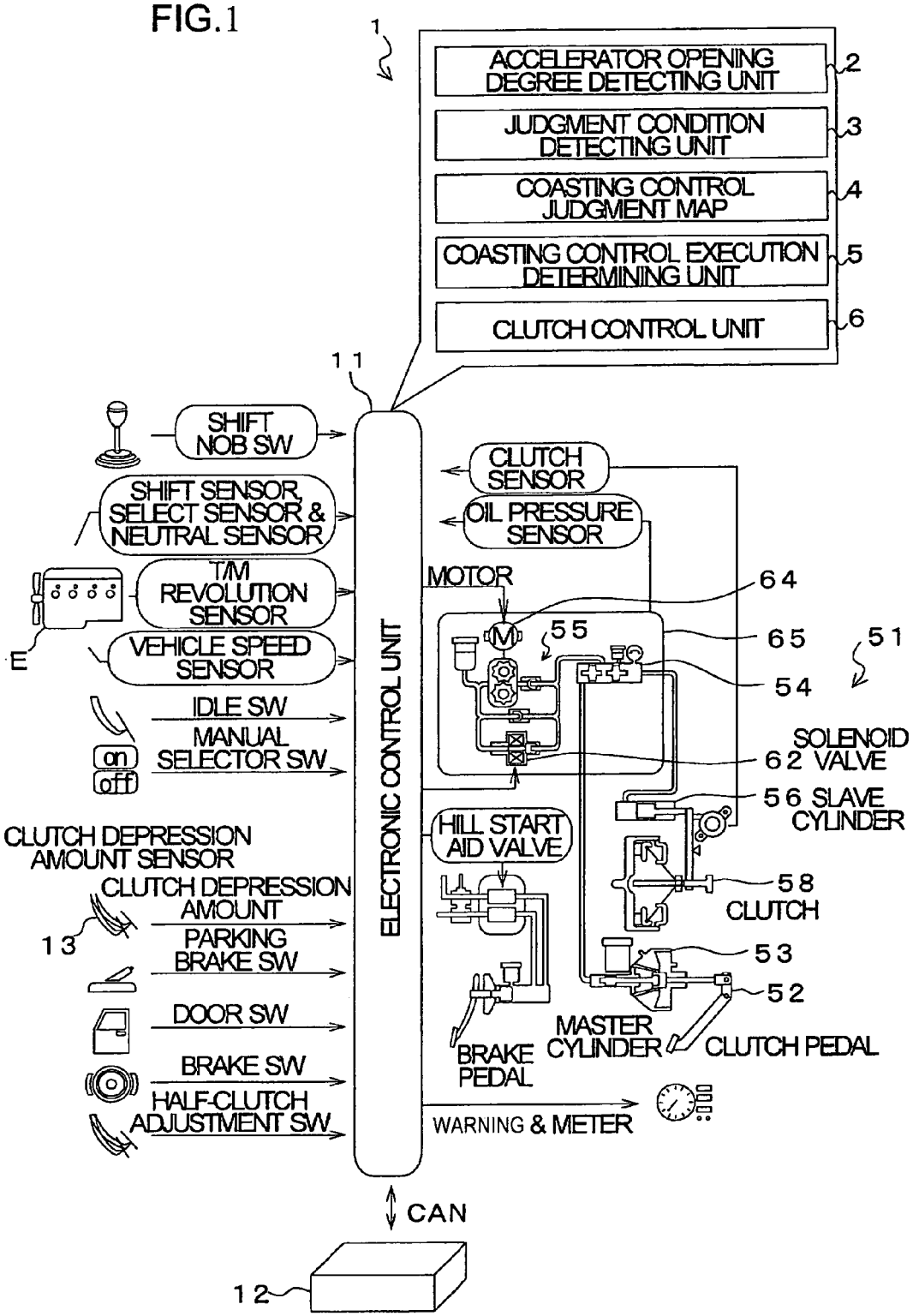
FIG. 1 is an input/output configuration diagram of a vehicle to which a coasting control device of the present invention is applied.

FIG. 1 is an input/output configuration diagram of a vehicle to which a coasting control device according to the present embodiment is applied.

As illustrated in FIG. 1, the vehicle includes an electronic control unit 11, which primarily controls a transmission and a clutch, and an ECM (Engine Control Module) 12, which primarily controls an engine.

Connected to the electronic control unit 11 are the input signal lines for a shift knob switch, a transmission shift sensor, a select sensor, a neutral switch, a TIM revolution sensor, a vehicle speed sensor, an idle switch, a manual selector switch, a parking brake switch, a door switch, a brake switch, a half-clutch adjustment switch, a clutch sensor, and an oil pressure switch. In the resent embodiment, a clutch pedal depression amount sensor 13 (clutch pedal position sensor) that measures the amount of depression of the clutch pedal 52 is provided, and an input signal line for the clutch pedal depression amount sensor 13 is also connected to the electronic control unit 11. Output signal lines for a motor for the hydraulic pump 64 and the solenoid valve 62, a hill start aid valve, a warning and meter of the clutch system 51 are also connected to the electronic control unit 11.

Various input signal lines and output signal lines, not depicted, used for engine control are connected to the ECM 12. The ECM 12 is capable of sending engine RPM, accelerator opening degree, and engine RPM change request signals to the electronic control unit 11 through CAN (Controller Area Network) transmission lines.

Here, the clutch system of the vehicle will be described.

Figure 2:
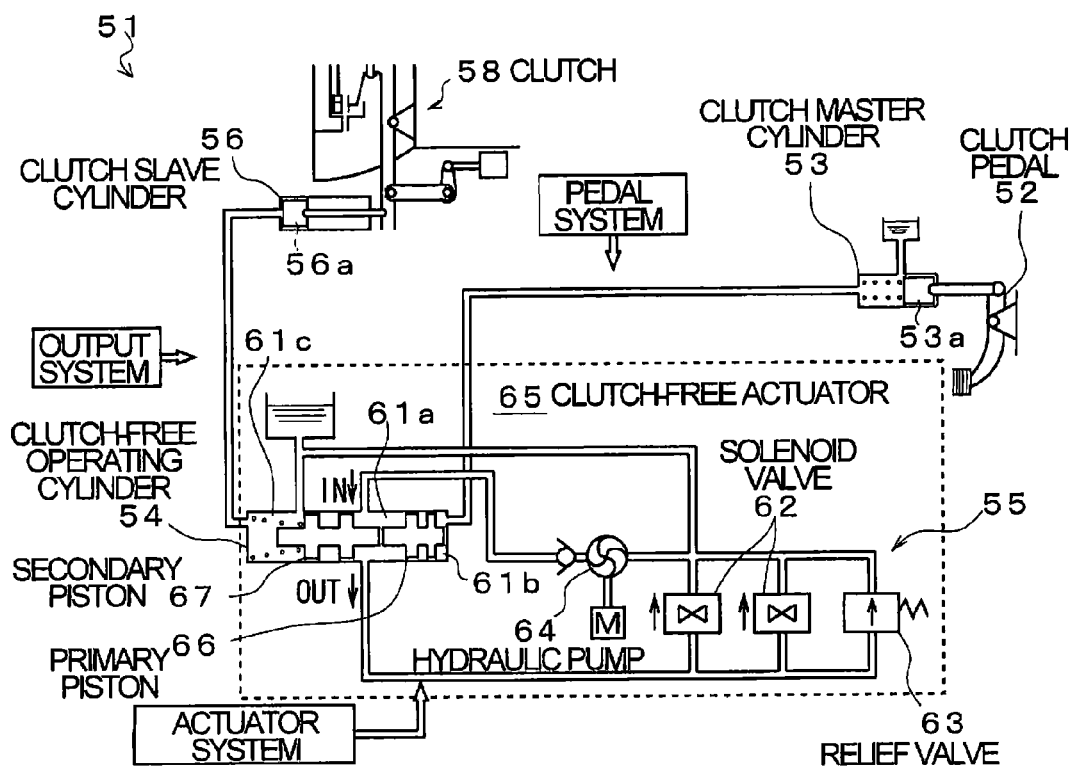
FIG. 2 is a block diagram of a clutch system of a vehicle to which the coasting control device of the present invention is applied.

As illustrated in FIG. 2, the clutch system 51 of the vehicle is a manual and automatic dual-mode clutch system that includes a clutch-free operating cylinder 54 which is supplied with hydraulic oil in response to depression of the clutch pedal 52 or by control of an actuator (clutch-free actuator unit) 55 and disengages a clutch 58 according to the amount of supplied hydraulic oil, and is capable of disengaging the clutch 58 by both of the clutch pedal 52 and the actuator.

More specifically, the clutch system 51 of the vehicle includes the clutch-free operating cylinder 54 including the primary piston 66 and the secondary piston 67 arranged in series, a the clutch-free actuator unit 55 acting as an actuator that supplies hydraulic oil to the intermediate cylinder chamber 61a provided between the primary piston 66 and the secondary piston 67, the clutch master cylinder 53 including the piston 53a mechanically connected to the clutch pedal 52 and supplying hydraulic oil to a cylinder chamber (pedal-side cylinder chamber) 61b on the primary piston 66 side of the clutch-free operating cylinder 54 with a stroke of the piston 53a, and the clutch slave cylinder 56 including the piston 56a which is mechanically connected to a movable part of the clutch 58, supplied with hydraulic oil with a stroke of the secondary piston 67 of the clutch-free operating cylinder 54 and disengages the clutch 58 according to the amount of the supplied hydraulic oil.

The clutch-free actuator unit 55 includes the hydraulic pump 64 supplying hydraulic oil to the intermediate cylinder chamber 61a, the solenoid valve 62 controlling the amount of hydraulic oil ejected from the intermediate cylinder chamber 61a, and the relief valve 63 and is placed in the clutch-free actuator 65 together with the clutch-free operating cylinder 54.

FIG. 2 illustrates a state in which the clutch pedal 52 is not pressed and the clutch 58 is engaged. When the clutch pedal 52 is pressed, the piston 53a of the clutch master cylinder 53 strokes to the left of the diagram according to the amount of depression, thereby supplying hydraulic oil to the pedal-side cylinder chamber 61b of the clutch-free operating cylinder 54 to cause the primary piston 66 to stroke to the left of the diagram. When hydraulic oil from the clutch master cylinder 53 causes the primary piston 66 to stroke, the secondary piston 67 strokes to the left of the diagram together with the primary piston 66 to push hydraulic oil in the cylinder chamber 61c on the secondary piston side (the cylinder chamber on the clutch side) to cause the hydraulic oil to be supplied to the clutch slave cylinder 56. When hydraulic oil is supplied from the clutch-free operating cylinder 54 to the clutch slave cylinder 56, the piston 56a strokes to the right of the diagram to disengage the clutch 58

On the other hand, to disengage the clutch 58 by the clutch-free actuator unit 55, hydraulic oil is supplied by the hydraulic pump 64 to the intermediate cylinder chamber 61a of the clutch-free operating cylinder 54 and the flow rate of hydraulic oil ejected from the intermediate cylinder chamber 61a is restricted by the solenoid valve 62. This increases the pressure of the hydraulic oil in the intermediate cylinder chamber 61a and causes the secondary piston 67 to stroke to the left of the diagram to feed hydraulic oil to the clutch slave cylinder 56 and the stroke of the piston 56a disengages the clutch 58. In the present embodiment, the solenoid valve 62 is controlled by PWM (Pulse-Width Modulation) output to control the flow rate of hydraulic oil ejected from the intermediate cylinder chamber 61a.

A coasting control device according to the present embodiment will be described below.

A coasting control device 1 which performs coasting control to disengage the clutch and decrease the engine RPM to an idle RPM (or an RPM equivalent to the idle RPM) when the engine does no work for the outside of the engine during moving is installed in the vehicle.

The operation principle of coasting control will be described first with reference to FIG. 3. The horizontal axis of FIG. 3 represents time and the flow of control and the vertical axis represents the engine RPM.

Figure 3:
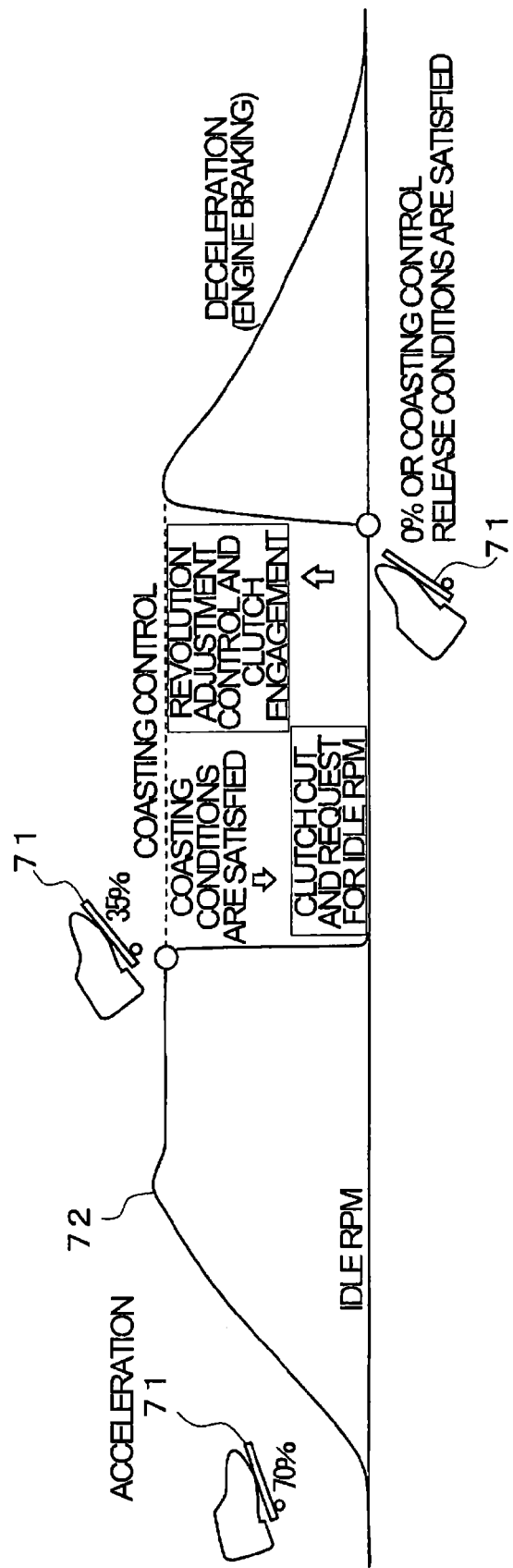
FIG. 3 is a conceptual operation diagram illustrating an overview of coasting control according to the present invention.

As illustrated in FIG. 3, while an accelerator pedal 71 is pressed down and the accelerator opening degree increases and stays at 70%, the engine RPM 72 increases to accelerate the vehicle. When the engine RPM 72 stabilizes and the amount of depression of the accelerator pedal 71 decreases to reduce the accelerator opening degree to 35%, conditions for starting coasting control, which will be described later, are satisfied. When coasting control is started, the clutch is disengaged and the engine RPM 72 is controlled to the idle RPM. Suppose that subsequently the accelerator pedal 71 is released and the accelerator opening degree decreases to 0% or other conditions for terminating coasting control are satisfied. Upon termination of the coasting control, the engine revolution is controlled and the clutch is engaged. Since the accelerator opening degree is 0% in this example, an engine braking state is entered to decelerate the vehicle.

If coasting control were not performed, the engine would be maintained at a high RPM as indicated by the dashed line during the coasting control and fuel would be wasted accordingly. Coasting control reduces the engine RPM 72 to the idle RPM, thereby saving fuel.

Returning to FIG. 1, specifically, the coasting control device 1 includes an accelerator opening degree detecting unit (accelerator position detecting unit) 2 which digitally samples an output signal from an accelerator opening degree sensor (accelerator position sensor) at predetermined time intervals and provides moving averages as accelerator opening degrees at the predetermined time intervals, a judgment condition detecting unit 3 which differentiates the accelerator opening degrees obtained at the predetermined time intervals to determine an accelerator opening speed and, when the accelerator opening degree is negative and its absolute value is smaller than a preset start reference value, permits the judgment of starting coasting control, a coasting control judgment map 4 which uses the accelerator opening degree and clutch rotation speed as measures and on which a coasting control threshold line is set along an engine output torque zero line (no-load line) which is the boundary between a negative region where the engine output torque is negative and a positive region where the engine output torque is positive, and a coasting control execution determining unit 5 which starts coasting control when the judgment of starting coasting control has been permitted and the coordinate points of the accelerator opening degree and clutch rotation speed have passed the coasting control threshold line in the direction in which the accelerator opening degree decreases.

Here, the clutch rotation speed is the number of rations of clutch on the driven side and is equal to the number of rotations of the input shaft of the transmission. In the present embodiment, a clutch rotation speed sensor is provided on the input shaft and the clutch rotation speed is detected from the number of rotations of the input shaft.

The accelerator opening degree detecting unit 2, the judgment condition detecting unit 3, the coasting control judgment map 4 and the coasting control execution determining unit 5 are preferably provided in the electronic control unit 11.

Figure 4:
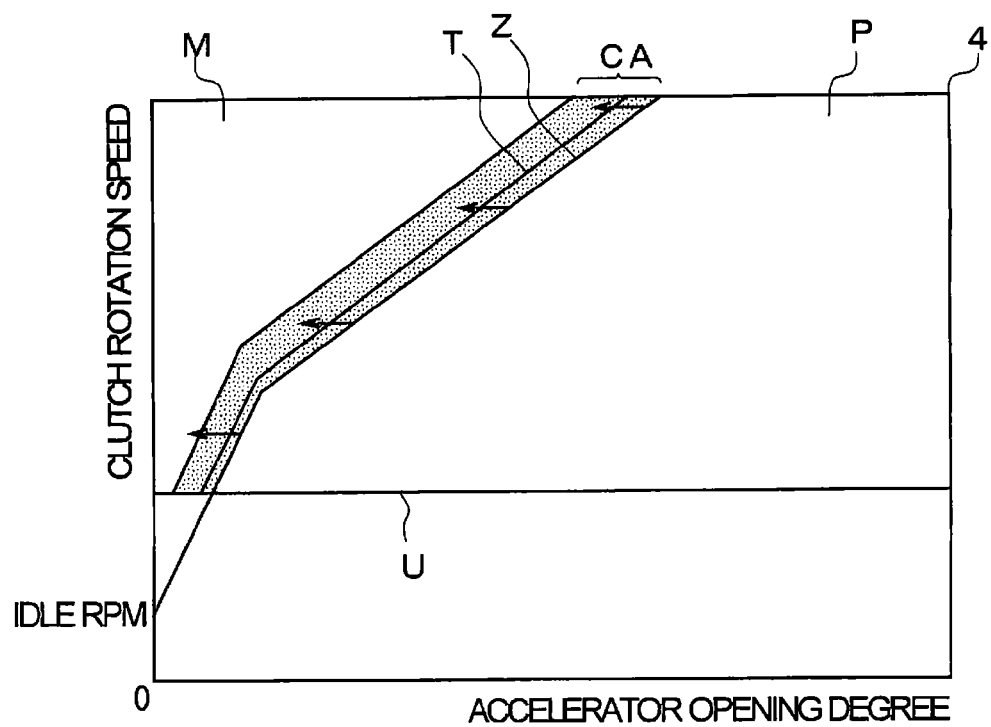
FIG. 4 is a graph image diagram of a coasting control judgment map according to the present invention.

FIG. 4 shows a graph image of the coasting control judgment map 4.

The coasting control judgment map 4 is prepared by measuring beforehand the correlation between the accelerator opening degree and the clutch rotation speed for the engine while the clutch is disengaged.

As illustrated in FIG. 4, the coasting control judgment map 4 is a map with the horizontal axis representing the accelerator opening degree and the vertical axis representing the clutch rotation speed. The coasting control judgment map 4 can be divided into two regions: a negative region M where the engine output torque is negative and a positive region P where the engine output torque is positive. Specifically, the negative region M is a region where the engine output torque is negative because the friction of the engine is greater than a demanded engine torque. The positive region P is a region where the engine output torque is positive because the demanded engine torque is greater than the friction of the engine. The engine output torque zero line (no-load line) Z which is the boundary between the negative region M and the positive region P represents a state in which the engine is doing no work for the outside the engine and fuel is being wasted.

In the present embodiment, the coasting control threshold line T is set slightly to the left of the engine output torque zero line Z (on the side where the accelerator opening degree is small) on the coasting control judgment map 4.

A coasting control available region CA having a finite width including the coasting control threshold line T is set between the negative region M and the position region P on the coasting control judgment map 4.

A clutch rotation speed lower threshold line U is set on the coasting control judgment map 4. The lower threshold line U defines the lower threshold value of the clutch rotation speed independently of the accelerator opening degree. As illustrated, the lower threshold line U is set slightly above the clutch rotation speed in the idle state.

The coasting control device 1 starts casting control when all of the following four coasting start conditions are satisfied.

(1) The speed of operation of the accelerator pedal is within the thresholds.

(2) The coasting control threshold line T on the coasting control judgment map 4 has been passed in the direction in which the accelerator pedal is released.

(3) Points plotted on the coasting control judgment map 4 are in the coasting control available region CA.

(4) The clutch rotation speed is above or on the lower threshold line U on the coasting control judgment map 4.

The coasting control device 1 ends coasting control when at least one of the following two coasting control end conditions is satisfied.

(1) The speed of operation of the accelerator pedal is beyond the thresholds.

(2) Points plotted on the coasting control judgment map 4 are out of the coasting control available region CA.

Figure 5:
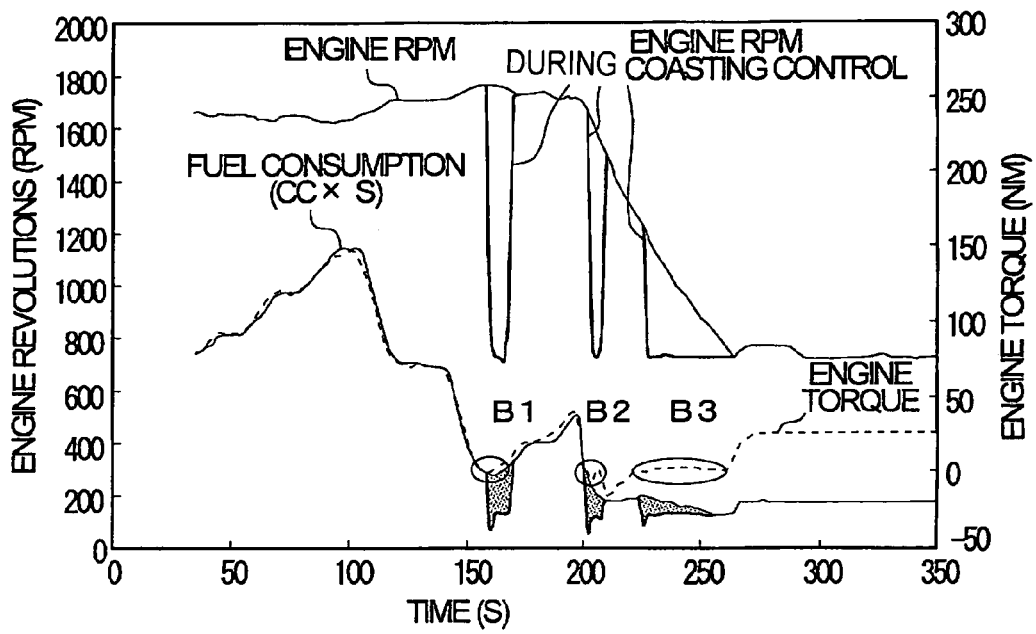
FIG. 5 is a graph illustrating a fuel saving effect of coasting control according to the present invention.

Fuel saving effects of the coasting control will be described with reference to FIG. 5.

It is assumed first that coasting control is not performed. The engine RPM is varying in the range from 1600 to 1700 rpm in the period from approximately 30 s to approximately 200 s and is decreasing from approximately 1700 rpm to approximately 700 rpm (idle rpm) in the period from approximately 200 s to approximately 260 s.

The engine torque is increasing in the period from approximately 30 s to approximately 100 s, then decreasing until approximately 150 s. The engine torque is approximately 0 Nm in the period from approximately 150 s to approximately 160 s (ellipse B1), in the period from approximately 200 s to approximately 210 s (ellipse B2), and in the period from approximately 220 s to approximately 260 s (ellipse B3).

The fuel consumption (which is not marked on the vertical axis but overlaid on the engine torque for convenience) changes substantially according to change in the engine torque in the period from approximately 50 s to approximately 200 s. The power consumption is not 0 even when the engine torque is approximately 0 Nm.

It is assumed that coasting control is performed here. The engine RPM is controlled by the idle RPM in the period in which the engine torque is approximately 0 Nm. In the graph, the line (thick solid line) that branches from the line (solid line) representing the engine RPM when not performing coasting control represents the engine RPM during coasting control. The coasting control was performed three times in the periods in ellipses B1, B2 and B3. The fuel consumptions in the periods in which coasting control was being performed is lower than the fuel consumption when coasting control was not performed, showing that fuel was saved.

Figure 6:
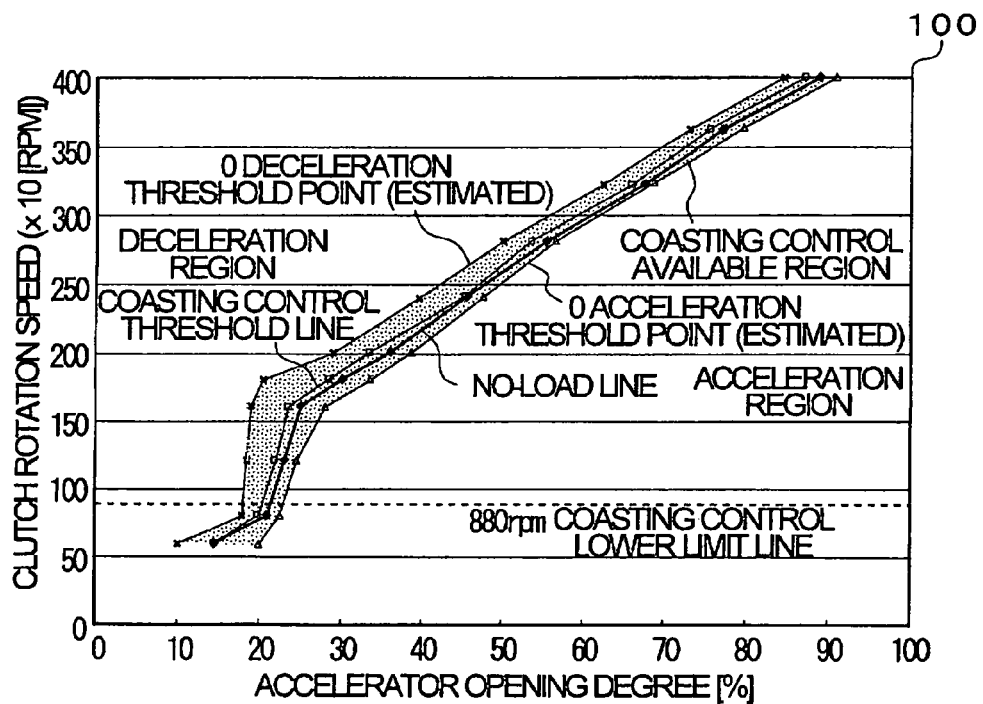
FIG. 6 is a diagram of a coasting control judgment map of coasting control actually performed according to the present invention.

FIG. 6 illustrates a coasting control judgment map 100 plotting coasting control performed actually. Points are plots of actually detected accelerator opening degrees and clutch rotation speeds. A negative region, a positive region, coasting control threshold lines (0 acceleration threshold and 0 deceleration threshold points) and a coasting control available region are set on the coasting control judgment map 100.

The coasting control device 1 according to the present embodiment further includes the clutch control unit 6 which controls the clutch-free actuator unit 55 to eject an amount of hydraulic oil that depends on the amount of depression of the clutch pedal 52 from the clutch-free operating cylinder 54 when the clutch pedal 52 is pressed during coasting control.

The clutch control unit 6 of the present embodiment determines the amount of hydraulic oil to be ejected from the intermediate cylinder chamber 61*a* according to the amount of depression of clutch pedal 52 measured by the clutch pedal depression amount sensor 13 and controls the solenoid valve 62 of the clutch-free actuator unit 55 so that the determined amount of hydraulic oil is ejected from the intermediate cylinder chamber 61*a*.

The clutch control unit 6 is provided in the electronic control unit 11, together with the accelerator opening degree detecting unit 2, the judgment condition detecting unit 3, the coasting control judgment map 4 and the coasting control execution determining unit 5. Note that the clutch control unit 6 may be provided in a unit (for example the ECM 12) different from the electronic control unit 11 or may be provided in a unit different from the unit in which the accelerator opening degree detecting unit 2, the judgment condition detecting unit 3, the coasting control judgment map 4 and the coasting control execution determining unit 5.

A control flow in the clutch control unit 6 will be described with reference to FIG. 7.

Figure 7:
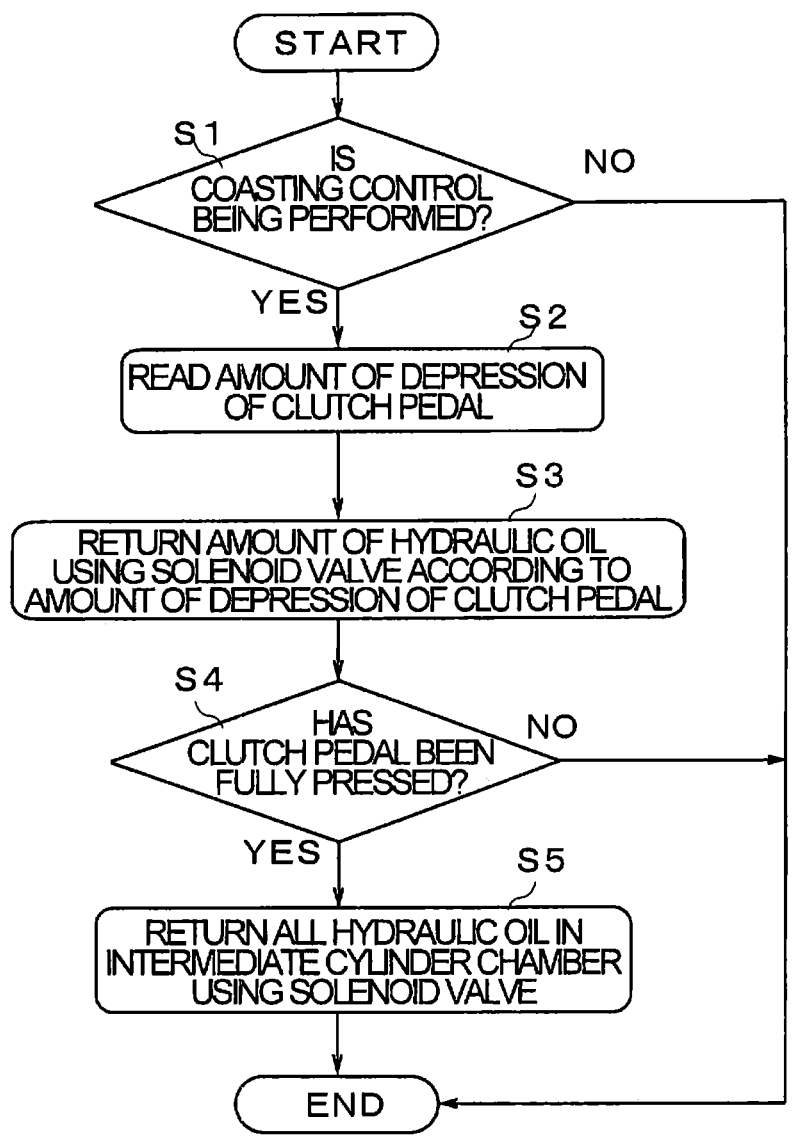
FIG. 7 is a flowchart illustrating a control flow of a coasting control device of the present invention.

As illustrated in FIG. 7, the clutch control unit 6 first determines whether or not coasting control is being performed (step S1). If the clutch control unit 6 determines that coasting control is not being performed (NO) at step S1, the process ends.

Figure 8:
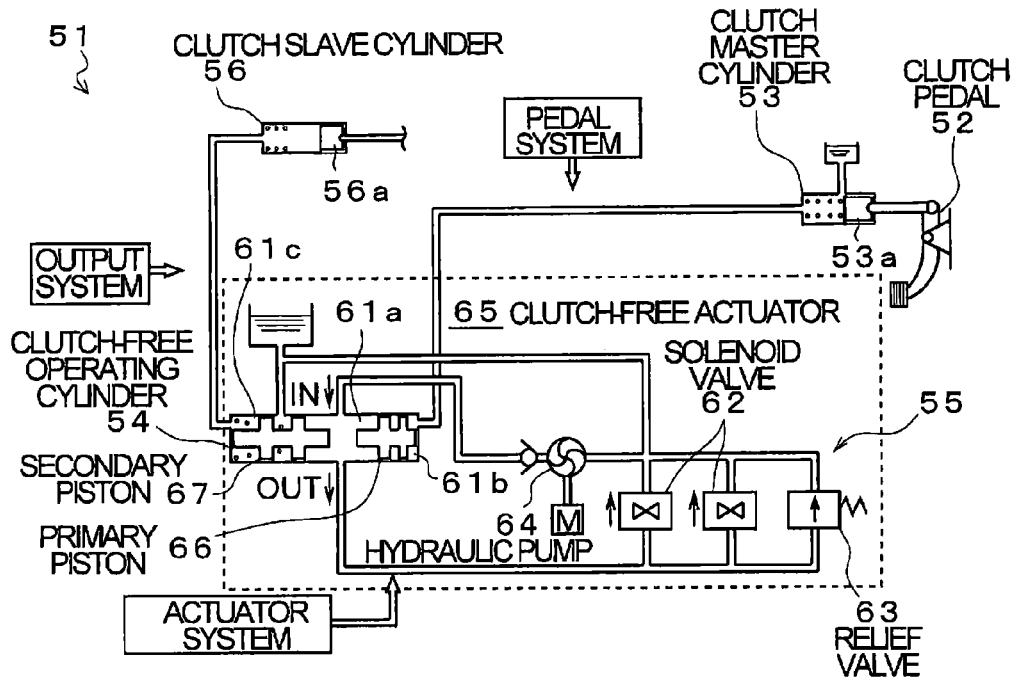
FIG. 8 is a diagram illustrating a state of a clutch system during coasting control according to the present invention.

If the clutch control unit 6 determines at step S1 that coasting control is being performed (YES), the clutch control unit 6 reads the amount of depression of the clutch pedal 52 from the clutch pedal depression amount sensor 13 (step S2). As illustrated in FIG. 8, hydraulic oil is supplied by the clutch-free actuator unit 55 to the intermediate cylinder chamber 61*a*, the secondary piston 67 strokes to the left of the diagram, and the piston 56*a* of the clutch slave cylinder 56 stokes to the right of the diagram to disengage the clutch 58 during coasting control.

Then, the clutch control unit 6 determines the amount of hydraulic oil to be ejected from the intermediate cylinder chamber 61*a* on the basis of the amount of depression of the clutch pedal 52 read at step S2 and controls the solenoid valve 62 to cause the determined amount of hydraulic oil to be ejected from the intermediate cylinder chamber 61*a* (step S3).

Specifically, since the amount of hydraulic oil supplied to the clutch-free operating cylinder 54 is proportional to the amount of depression of the clutch pedal 52, the amount of hydraulic oil supplied to the cylinder chamber 61*b* on the pedal side can be determined by multiplying the amount of depression of the clutch pedal 52 by a predetermined coefficient. In the present embodiment, the solenoid valve 62 is controlled to cause the amount of hydraulic oil equal to the amount of hydraulic oil supplied to the cylinder chamber 61*b* on the pedal side in response to an operation of the clutch pedal 52 to be ejected from the intermediate cylinder chamber 61a. The method for determining the amount of hydraulic oil to be ejected from the intermediate cylinder chamber 61a is not limited to this. For example, a map of the amount of hydraulic oil to be ejected from the intermediate cylinder chamber 61a in proportion to the amount of depression of the clutch pedal 52 may be prepared beforehand and the map is used to determine the amount of hydraulic oil to be ejected from the intermediate cylinder chamber 61a.

Figure 9:
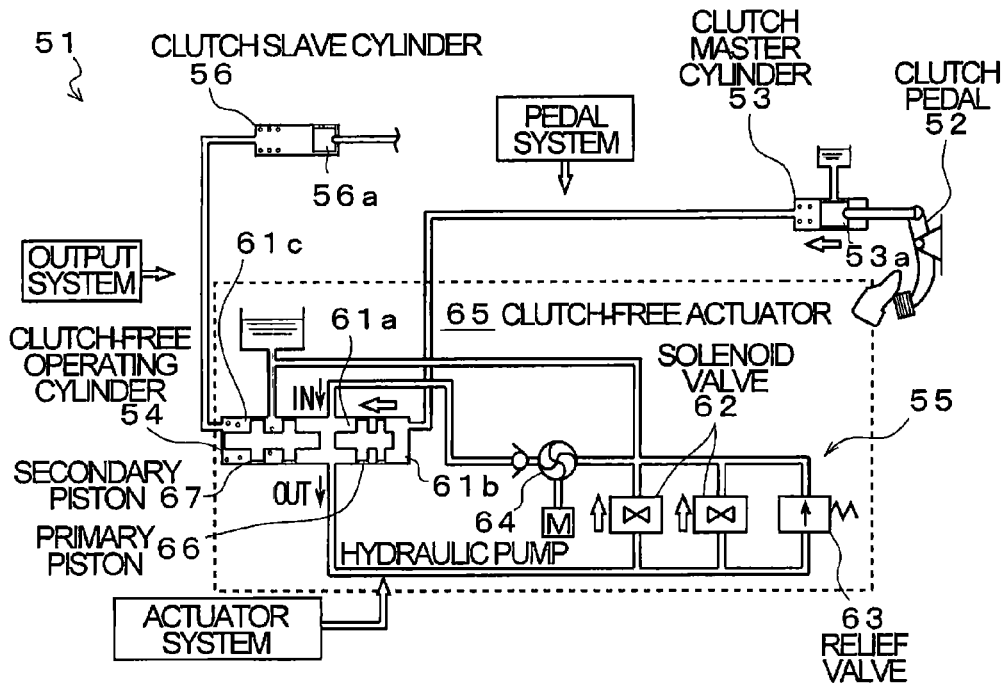
FIG. 9 is a diagram illustrating a state of the clutch system when a clutch pedal is pressed during coasting control according to the present invention.

The amount of hydraulic oil thus determined is ejected from the intermediate cylinder chamber 61a by controlling the solenoid valve 62. As a result, the piston 53a of the clutch master cylinder 53 strokes to the left of the diagram according to the amount of depression of the clutch pedal 52 as illustrated in FIG. 9, the stroke of the piston 53a feeds hydraulic oil to cause the primary piston 66 of the clutch-free operating cylinder 54 to stroke to the left of the drawing. At this time, since the amount of hydraulic oil supplied to the clutch-free operating cylinder 54 is equal to the amount of hydraulic oil ejected from the clutch-free operating cylinder 54, the oil pressure on the secondary piston 67, that is the oil pressure in the clutch slave cylinder 56, does not change.

Then, the clutch control unit 6 determines whether or not the clutch pedal 52 has been fully pressed (step S4). If the clutch control unit 6 determines that the clutch pedal 52 has been fully pressed (YES), the clutch control unit 6 opens the solenoid valve 62 to eject all of the hydraulic oil in the intermediate cylinder chamber 61a (step S5), and then the process ends. If the clutch control unit 6 determines at step S4 that the clutch pedal 52 has not been fully pressed (NO), the process ends.

Figure 10:
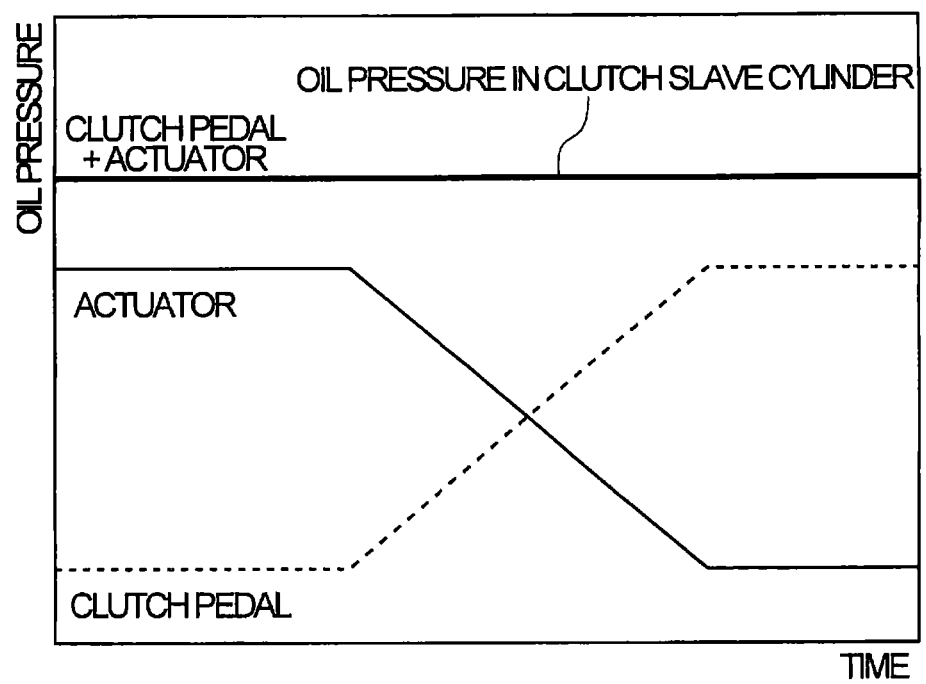
FIG. 10 is a diagram illustrating that the sum of oil pressure applied by a clutch pedal and oil pressure applied by an actuator becomes constant when the clutch pedal is pressed during coasting control according to the present invention.
Figure 11:
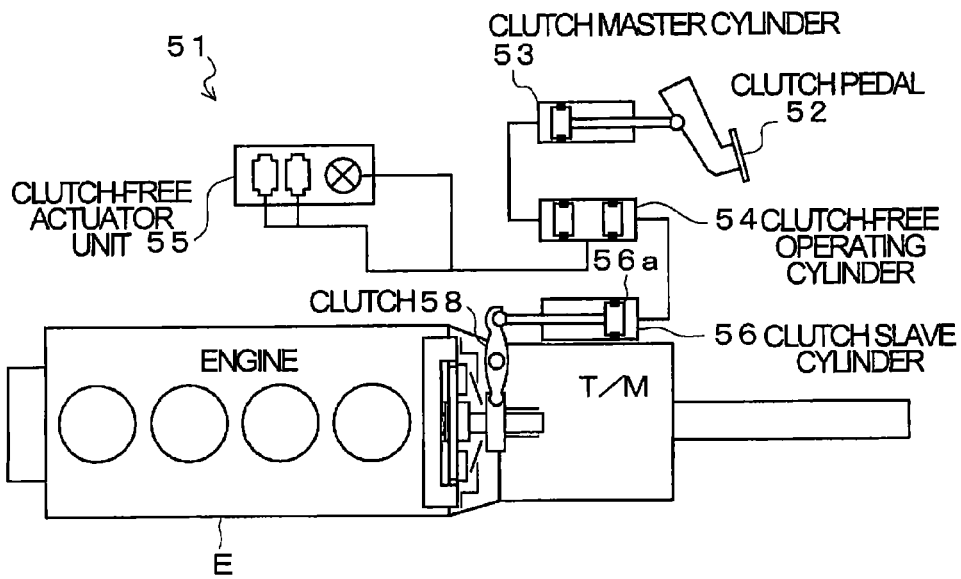
FIG. 11 is a block diagram of a manual and automatic dual-mode clutch system.
Figure 12:
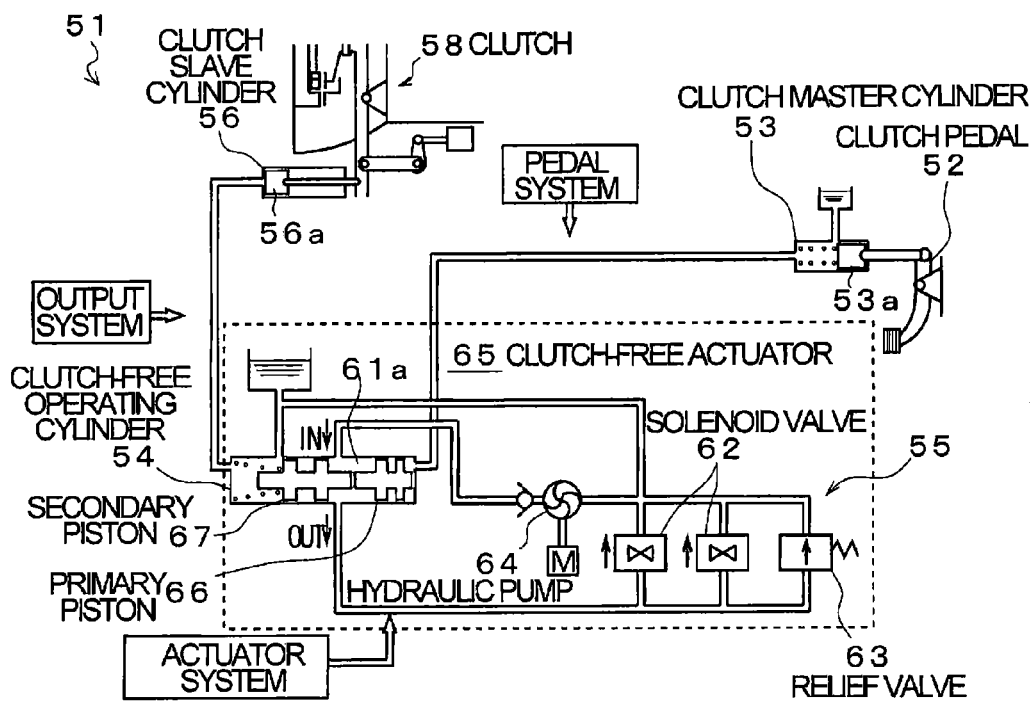
FIG. 12 is a detailed block diagram of the clutch system in FIG. 11.

As the oil pressure applied by depression of the clutch pedal 52 (the oil pressure in the clutch master cylinder 53 indicated by the dashed line in FIG. 10) increases as illustrated in FIG. 10 by the control of the clutch control unit 6 as illustrated in FIG. 7, the oil pressure on the clutch-free actuator unit 55 (the thin solid line in FIG. 10) decreases accordingly. As a result, the oil pressure on the secondary piston 67, that is, the oil pressure on the clutch slave cylinder 56 (the thick solid line in FIG. 10) is maintained constant. This means that the clutch control unit 6 gradually switches the control of the clutch 58 from the clutch-free actuator unit 55 to the clutch pedal 52 according to the amount of depression of the clutch pedal 52.

As has been described above, the coasting control device 1 according to the present embodiment includes the clutch control unit 6 that controls the clutch-free actuator unit 55 to cause an amount of hydraulic oil that depends on the amount of depression of the clutch pedal 52 to be ejected from the clutch-free operating cylinder 54 when the clutch pedal 52 is pressed during coasting control.

This allows a driver pressing the clutch pedal 52 to smoothly press down on the clutch pedal 52 during coasting control, thereby reducing uneasiness which would otherwise be experienced by driver when the driver presses the clutch pedal 52 during coasting control. Furthermore, since the coasting control device 1 prevents kickback of the clutch pedal 52, the driver does not become panicky to go into a dangerous mode.

While the amount of hydraulic oil to be ejected from the intermediate cylinder chamber 61a is determined according to the amount of depression of the clutch pedal 52 measured by the clutch pedal depression amount sensor 13 and the solenoid valve 62 is controlled to eject the determined amount of hydraulic oil from the intermediate cylinder chamber 61a in the embodiment described above, the method of ejection is not limited to this. For example, an oil pressure sensor may be provided to measure the oil pressure in the intermediate cylinder chamber 61a and the solenoid valve 62 may be controlled to maintain the oil pressure measured by the oil pressure sensor constant, thereby ejecting the amount of hydraulic oil depending on the amount of depression of the clutch pedal 52 from the intermediate cylinder chamber 61a. In that case, the oil pressure sensor may be provided on a pipe (that carries hydraulic oil), for example, connecting the intermediate cylinder chamber 61a with the solenoid valve 62. Since maintaining the oil pressure in the intermediate cylinder chamber 61a constant can maintain the oil pressure in the clutch slave cylinder 56 constant, the same effect as in the coasting control device 1 described earlier can be achieved.

The invention claimed is:

1. A coasting control device configured to be installed in a vehicle including a clutch system that is supplied with hydraulic oil in response to depression of a clutch pedal or control by an actuator and disengages a clutch according to an amount of the supplied hydraulic oil and, when an engine is not doing work outside the engine while the vehicle is moving, and to perform coasting control to cause the actuator to disengage the clutch and decrease an engine's revolutions per minute to an idle revolutions per minute, the coasting control device comprising:
    a clutch control unit performing a control to cause an amount of the supplied hydraulic oil that depends on an amount of depression of the clutch pedal to be ejected from the actuator when the clutch pedal is depressed during the coasting control; and
    a clutch pedal depression amount sensor measuring the amount of depression of the clutch pedal,
    wherein the clutch system includes:
    a clutch-free operating cylinder having a clutch pedal side and a clutch side, including a primary piston and a secondary piston arranged in series, and including an intermediate cylinder chamber formed between the primary piston and the secondary piston, a clutch pedal-side cylinder chamber receiving the primary piston and which is supplied with hydraulic oil from the clutch pedal side, and a clutch-side cylinder chamber receiving the secondary piston and which supplies hydraulic oil to the clutch side; and
    the actuator including a hydraulic pump supplying hydraulic oil to the intermediate cylinder chamber and a solenoid valve controlling an amount of hydraulic oil ejected from the intermediate cylinder chamber; and
    the clutch control unit determines the amount of the hydraulic oil to be ejected from the intermediate cylinder chamber according to the measured amount of depression of the clutch pedal and controls the solenoid valve to cause the determined amount of the hydraulic oil to be ejected from the intermediate cylinder chamber.

2. A coasting control device configured to be installed in a vehicle including a clutch system that is supplied with hydraulic oil in response to depression of a clutch pedal or control by an actuator and disengages a clutch according to an amount of the supplied hydraulic oil and, when an engine is not doing work outside the engine while the vehicle is moving, and to perform coasting control to cause the actuator to disengage the clutch and decrease an engine's revolutions per minute to an idle revolutions per minute, the coasting control device comprising:
    a clutch control unit performing a control to cause an amount of the supplied hydraulic oil that depends on an amount of depression of the clutch pedal to be ejected from the actuator when the clutch pedal is depressed during the coasting control, wherein the clutch system includes:

a clutch-free operating cylinder having a clutch pedal side and a clutch side, including a primary piston and a secondary piston arranged in series, and including an intermediate cylinder chamber formed between the primary piston and the secondary piston, a clutch pedal side cylinder chamber receiving the primary piston and which is supplied with hydraulic oil from the clutch pedal side, and a clutch-side cylinder chamber receiving the secondary piston and which supplies hydraulic oil to the clutch side; and the actuator including a hydraulic pump supplying hydraulic oil to the intermediate cylinder chamber and a solenoid valve controlling an amount of hydraulic oil ejected from the intermediate cylinder chamber;

an oil pressure sensor measuring a pressure of the hydraulic oil in the intermediate cylinder chamber; and the clutch control unit controls the solenoid valve so that the measured pressure of the hydraulic oil is maintained constant to cause an amount of the hydraulic oil that depends on the amount of depression of the clutch pedal to be ejected from the intermediate cylinder chamber.

* * * * *